US010180208B2

(12) United States Patent
Vlaar (10) Patent No.: US 10,180,208 B2
(45) Date of Patent: Jan. 15, 2019

(54) COUPLING DEVICE FOR COUPLING AN ACCESSORY TO A CARRYING ARM, SUCH CARRYING ARM AND A HOLDING BAR

(71) Applicant: Vlaar Innovations B.V., Midwoud (NL)

(72) Inventor: Erik Jacobus Vlaar, Midwoud (NL)

(73) Assignee: Vlaar Innovations B.V., Midwoud (NL)

( * ) Notice: Subject to any disclaimer, the term of this patent is extended or adjusted under 35 U.S.C. 154(b) by 0 days.

(21) Appl. No.: 14/783,063

(22) PCT Filed: Apr. 4, 2014

(86) PCT No.: PCT/NL2014/050210
§ 371 (c)(1),
(2) Date: Oct. 7, 2015

(87) PCT Pub. No.: WO2014/168472
PCT Pub. Date: Oct. 16, 2014

(65) Prior Publication Data
US 2016/0069509 A1    Mar. 10, 2016

(30) Foreign Application Priority Data
Apr. 9, 2013  (NL) ..................... 2010596

(51) Int. Cl.
*F16M 11/00* (2006.01)
*F16M 13/02* (2006.01)
(Continued)

(52) U.S. Cl.
CPC ............. *F16M 13/02* (2013.01); *F16C 11/04* (2013.01); *F16C 11/06* (2013.01); *F16M 11/041* (2013.01);
(Continued)

(58) Field of Classification Search
CPC ...... F16M 11/04; F16M 11/041; F16M 11/08; F16M 11/00
See application file for complete search history.

(56) References Cited

U.S. PATENT DOCUMENTS 6,138,970 A * 10/2000 Sohrt ..................... F16M 11/10
248/278.1
7,922,132 B2 * 4/2011 Saez ..................... F16M 11/04
248/124.1
(Continued)

FOREIGN PATENT DOCUMENTS

CN        102 608 843        7/2012

OTHER PUBLICATIONS

International Search Report from PCT/NL2014/050210 dated Jun. 17, 2014.

*Primary Examiner* — Amy J. Sterling
(74) *Attorney, Agent, or Firm* — Adsero IP (57) ABSTRACT

The various aspects relate to a coupling device (100) for coupling an accessory to a carrying arm (120), such carrying arm and a holding bar (450) to be provided between the carrying arm and one or more coupling devices. The coupling device comprises a coupling module (120) for coupling the accessory to the coupling device, a first connector (112) for providing a releasable connection to the carrying arm, the carrying arm comprising a second connector (114) arranged to be connected to the first connector and a joint for connecting the first connector to the coupling module. The joint comprises a first joint member (110) connected to the coupling module and a second joint member connected to the first connector, the joint members are connected for providing the joint such that the first joint member and the second joint member are swivelable and the first connector is directed under an angle with respect to the joint axis.

17 Claims, 8 Drawing Sheets

(51) Int. Cl.
*F16M 11/04* (2006.01)
*F16M 11/14* (2006.01)
*F16M 11/20* (2006.01)
*F16C 11/04* (2006.01)
*F16C 11/06* (2006.01)

(52) U.S. Cl.
CPC ......... *F16M 11/14* (2013.01); *F16M 11/2014* (2013.01); *F16M 11/2078* (2013.01)

(56) References Cited

U.S. PATENT DOCUMENTS

| | | | |
|---|---|---|---|
| 9,448,588 B2 * | 9/2016 | Barnard | G06F 1/1626 |
| 2010/0128423 A1 * | 5/2010 | Moscovitch | F16M 11/04 |
| | | | 361/679.01 |
| 2011/0147546 A1 | 6/2011 | Monsalve | |
| 2012/0175474 A1 | 7/2012 | Barnard | |

* cited by examiner

Fig. 7B

COUPLING DEVICE FOR COUPLING AN ACCESSORY TO A CARRYING ARM, SUCH CARRYING ARM AND A HOLDING BAR

RELATED APPLICATIONS

This application is a 35 U.S.C. § 371 national phase application of PCT/NL2014/050210 (WO 2014/168472), filed on Apr. 4, 2014, entitled "Coupling Device for Coupling an Accessory to a Carrying Arm, Such Carrying Arm and a Holding Bar", which application claims the priority to Netherlands Application No. 2010596, filed Apr. 9, 2013, which is incorporated herein by reference in its entirety.

TECHNICAL FIELD

The various aspects relate to arms for carrying accessories and devices and connection modules for connecting such accessories and devices to the arms.

BACKGROUND

Various carrying arms for carrying monitor displays are available on the market. Monitors may be fixed directly to such arms via a connector plate with screw holes spaced apart in accordance with the FDMI standard (Flat Display Mounting Interface), which connector plate is fixed to the carrying arm, either directly or via swivelable joints. Also arms are available with a detachable connector plate. This allows monitor displays to be removed from the arm quickly and conveniently for safe storage and efficiently connecting the connector plate to the monitor display.

SUMMARY

It is preferred to provide a system for carrying accessories and devices like a monitor display and parts thereof that provide more flexibility.

A first aspect provides a coupling device for coupling an accessory to a carrying arm. The coupling device comprises a coupling module for coupling the accessory to the coupling device, a first directional connector for providing a releasable connection to the carrying arm, the carrying arm comprising a second directional connector arranged to be connected to the first directional connector and a joint for connecting the first directional connector to the coupling module. The joint comprises a first joint member connected to the coupling module and a second joint member connected to the first directional connector, the first joint member and the second joint member are connected for providing the joint such that the first joint member and the second joint member are swivelable relative to one another in at least one dimension over at least one swiveling axis which swiveling axis is provided under an angle with respect the orientation of the first directional connector and the first directional connector is directed in a longitudinal orientation with respect to the joint if the joint is in substantially a centre position.

Such coupling device allows for flexibility in building carrying systems for multiple monitors, by providing the joint fixed to the coupling module—like a coupling plate—and providing the releasable connector to the second joint member, rather than providing the releasable connection between the coupling module and the first joint member. This is because such coupling device is suitable for connecting an accessory to a single arm, but also for connecting the accessory to a larger holding module like a holding bar, together with other accessories. Such larger holding module may in turn be connected to the arm.

Each accessory is preferably connected to such holding module via a joint, because this allows for a usually desired ability to adjust an angle of each accessory, like a monitor display. By providing the coupling device according to the first aspect, only the second directional connector would have to be provided with the larger holding module—or the carrying arm, for that matter—rather than a full joint with a connector for connecting to a connector plate. This allows for flexibility in design and building, but also for less complexity per individual part and in more efficient storage management.

A second aspect provides an arm for carrying an accessory. The arm comprises an arm member and a second directional connector arranged to be connected to the first directional connector of the coupling device according to the first aspect for providing a releasable connection to the coupling device according to the first aspect. The second directional connector is pivotally connected to the arm member via a pivotal connection member and the second directional connector is connected to the arm member such that the second directional connector is oriented substantially perpendicular to a pivotal axis of the pivotal connection member.

Together with the coupling device according to the first aspect, this allows, in addition to the advantages indicated previously, for a flexible and compact system for carrying accessories.

A third aspect provides a holding bar for holding at least two accessories. The holding bar comprises a third directional connector arranged to be connected to the second directional connector of the arm according to the second aspect, a fourth directional connector arranged to be connected to the first directional connector of the coupling device according to the first aspect for providing a releasable connection to the coupling device according to the first aspect; and a fifth directional connector arranged to be connected to the first directional connector of the coupling device according to the first aspect for providing a releasable connection to the coupling device according to the first aspect. The third directional connector, the fourth directional connector and the fifth directional connector are oriented substantially perpendicular to a longitudinal direction of the holding bar, the fourth directional connector and the fifth directional connector are oriented substantially parallel to one another; and the third directional connector is oriented in a direction substantially opposite to that of the fourth directional connector and the fifth directional connector.

Such holding bar extends the opportunities for flexibly providing a solution for carrying multiply accessories by means of one or more carrying arms.

A fourth aspect provides a kit of parts comprising at least two of the coupling devices according to the first aspect, the arm according to the second aspect and the holding bar according to the third aspect.

BRIEF DESCRIPTION OF THE DRAWINGS

The various aspects and embodiments thereof will now be discussed in conjunction with Figures. In the Figures,
FIG. 2 A: shows a carrying arm viewed from a side;
FIG. 2 B: shows the carrying arm viewed from the top.

FIG. 6-A: shows a second monitor connection module from the top; and

FIG. 6-B: shows a second monitor connection module from a side.

FIG. 7A shows a partial cross-sectional schematic view taken along lines 7-7 of FIG. 3 showing the male connector sleeve moved against the bias out of the rest position.

DETAILED DESCRIPTION

Figure 1:
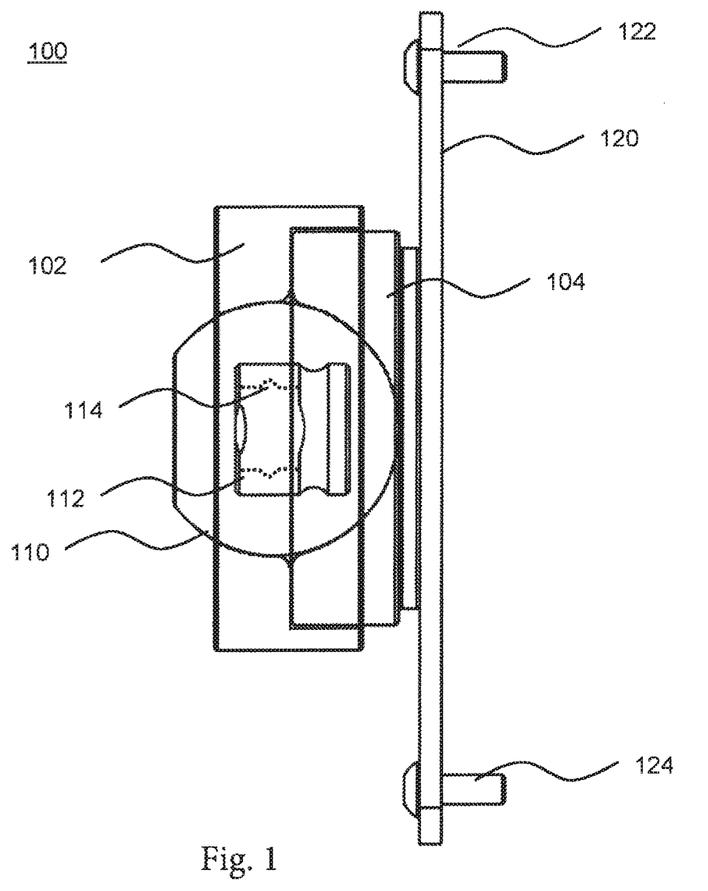
FIG. 1: shows a monitor connection module.

FIG. 1 shows a monitor connection module 100 as a coupling device. The monitor connection module 100 is arranged for coupling a monitor—in the sense of a display—to a carrying arm. The monitor connection module 100 comprises a ball 110 as a second joint member of a ball joint. The ball 110 is connected to a female quick release connector 112 as a first directional connector for connecting the monitor connection module 100 to the carrying arm. In this particular embodiment, the ball 110 is connected to the female quick release connector 112 by the female quick release connector 112 being incorporated in the ball 110.

The female quick release connector 112 comprises an indentation 114 at the inside wall of the female quick release connector 112. The indentation may be provided as a local indentation or as a circumferential groove along the inner wall of the female quick release connector 112. The ball 110 is preferably made out of plastic and the female quick release connector 112 may be incorporated while the ball 110 is moulded. Alternatively, the female quick release connector 112 and the ball 110 are provided in one single piece and one single material.

The ball 110 is confined in a first joint member comprising a joint cover housing 102 and a joint bottom housing 104. The joint cover housing 102 and the joint bottom housing 104 provide a cavity with an opening having a smaller circumference than the largest diameter of the cavity, thereby retaining the ball 110. The joint bottom housing 104 is connected to a connector plate 120. In another embodiment, the joint bottom housing 104 and the connector plate 120 may be provided in a single piece of material. The connections between the joint cover housing 102, the joint bottom housing 104 and the connector plate 120 may be provided by means of screws, welds, snap-fit connections, nuts-and-bolts, other, or a combination thereof.

The connector plate 120 acts as a coupling module for coupling the monitor to the monitor connection module 100. Alternatively or additionally to the connector plate 120, a holder for a tablet computer, a holder for a mobile telephone, a holder for a laptop computer, a document holder, a holder for other equipment, another holder for other equipment or a combination thereof may be provided with the connection module 100.

The connector plate 120 is preferably a rectangular and in particular square plate comprising four holes at such distances as defined by the VESA (Video Electronics Standards Association) by means of the FDMI standard (Flat Display Mounting Interface). FIG. 1 shows a first screw 122 and a second screw 124 provided in holes provided in the connector plate 120 for connecting a monitor to the monitor connection module 100.

The female quick release connector 112 is a directional connector in the sense that a male part can be inserted in one direction and preferably in one single direction. In this case the one single direction is horizontal in the plane of FIG. 1. The female quick release connector 112 is provided in the ball 110 such that with the ball being in a centred position, the female quick release connector 112 is provided in a longitudinal orientation with respect to the joint provided by the ball 110 and a housing provided by the joint cover housing 102 and the joint bottom housing 104. The centred position of the swivelable connection is not necessarily the position between two extremities of swiveling action. Rather, the centred position is the position that a person would consider to be the centred position, where two parts swivelable with respect to one another are provided in elongated continuation of one another—rather than being provided in an angle relative to one another.

The ball 110 on one hand and the joint cover housing 102 and the joint bottom housing 104 on the other hand provide a joint. The joint enables the ball on one hand and the joint cover housing 102 and the joint bottom housing 104 on the other hand to swivel in any direction with a pivotal axis perpendicular to the orientation of the female quick release connector 112 and over a pivotal axis axially oriented to the female quick release connector 112. Alternatively, a joint is provided that is swivelable over a pivotal axis that is oriented perpendicularly or axially with respect to the female quick release connector 112.

As an alternative to the ball joint, also other swivelable joints may be provided. Either one joint may be provided or a combination of two or more joints. Such joints may be of the type enabling a swivel movement or of a type enabling movement in two or more directions, for example a uni-directional swivel joint. The joint preferably allows a swiveling action over an axis that is under an angle with the orientation of the quick release connector 112.

Figure 2A:
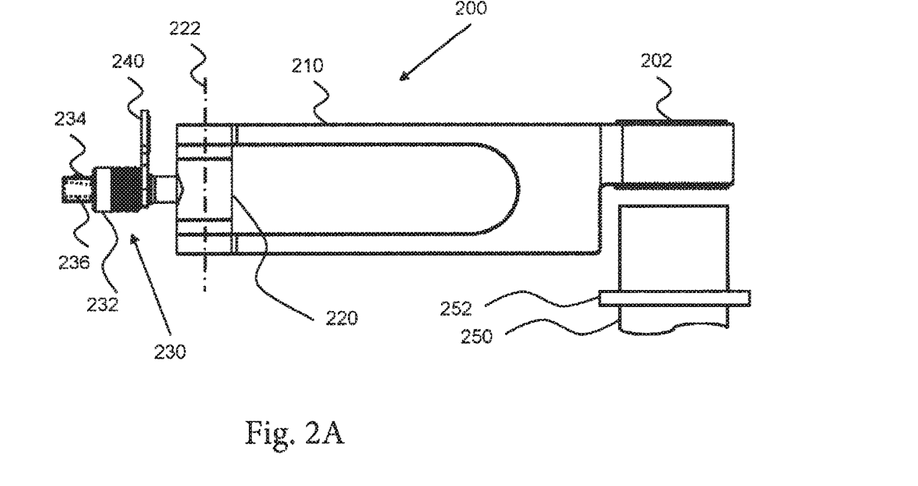

FIG. 2 A shows a side view of a carrying arm 200 for carrying an accessory. The carrying arm comprises an arm member 210 comprising a hole 202 for providing a swivelable connection with a stationary stand 250. The stationary stand 250 is preferably a pole with a substantially cylindrical shape. The stationary stand 250 comprises in this embodiment a flange 252 for preventing the carrying arm 200 from sliding too low along the stationary stand 250. Alternatively or additionally, the hole 202 may be provided as a blind hole for the same purpose.

Figure 3:
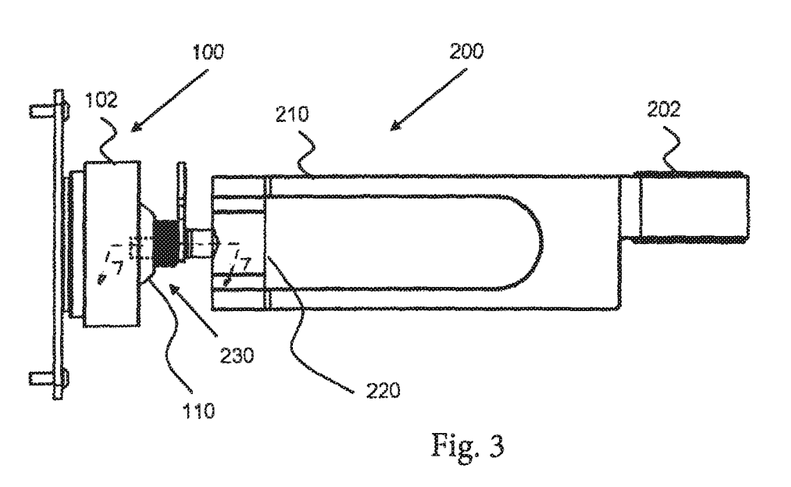
FIG. 3: shows the carrying arm and the monitor connection module in a connected state.

Referring to FIG. 2A, the carrying arm 200 further comprises a connector holding member 220 which is pivotally connected to the arm member 210 and pivotable over a pivoting axis 222. The connector holding member 220 has a male quick release connector 230 connected to it as a second directional connector. See also FIG. 7A which is a partial cross-section along line 7-7 of FIG. 3 showing the male quick release connector 230 connected to the female quick release connector 112. The male quick release connector 230 has a sliding male connector sleeve 232 provided around an inner male connector member 236 which is drawn by means of a dotted line in FIG. 2A (and appears as a solid line in FIG. 7A). By sliding the male connector sleeve 232 towards the arm member 210 in the direction of the arrow 700 as shown in FIG. 7B, a securing ball 234, provided partially in a cavity 233 in the male connector sleeve 232 and partially in a cavity 237 in the inner male connector member 236, is allowed to lower, due to a slightly tapered shape of the inner male connector member 236. The lowering of the securing ball 234 results in the securing ball not to protrude anymore from the male connector sleeve 232, which in turn allows the male quick release connector 230 to be inserted in the female quick release connector 112

(described with reference FIG. 1 and as shown in FIG. 3 and FIG. 7B).

Figure 2B:
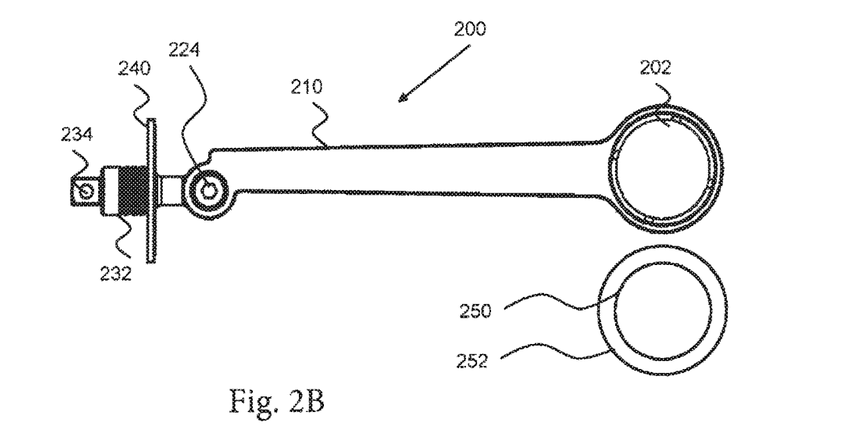
Figure 7A:
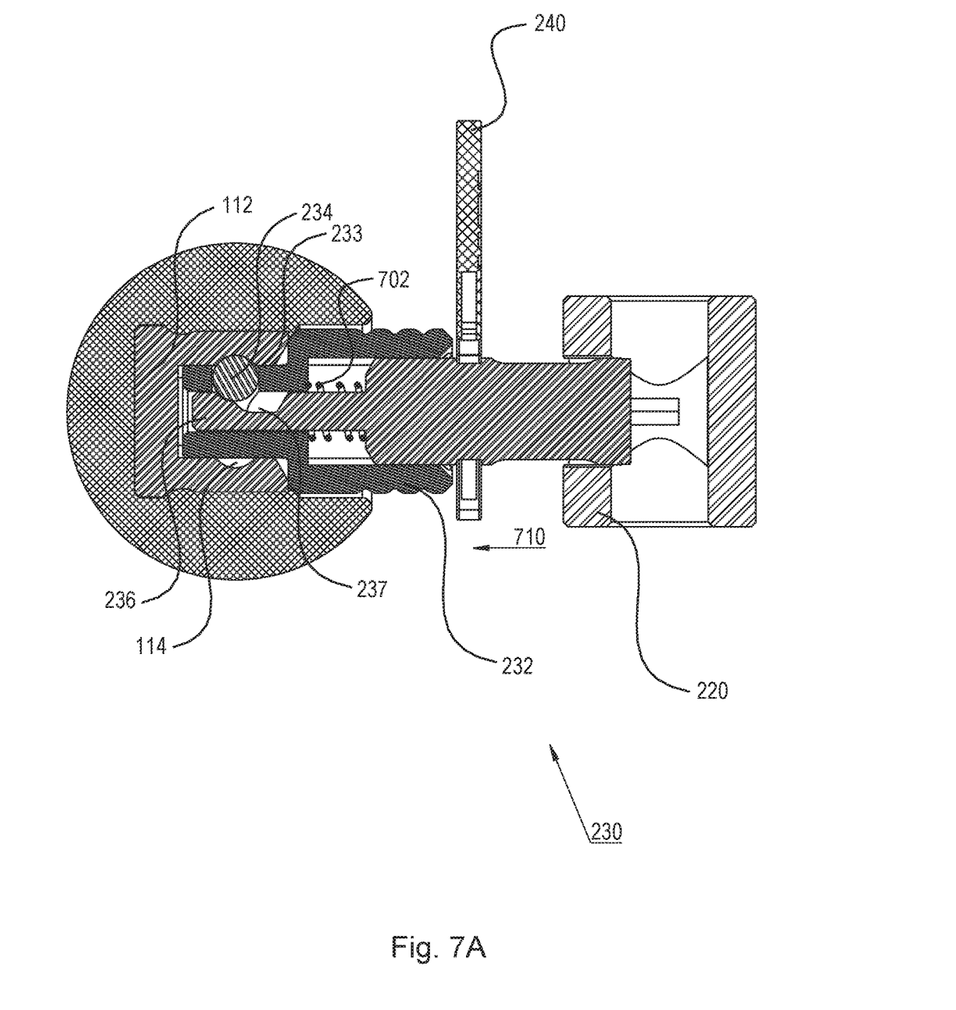
FIG. 7A shows a partial cross-sectional schematic view taken along lines 7-7 of FIG. 3 showing the male connector sleeve biased to a rest position; and FIG. 7B
Figure 7B:
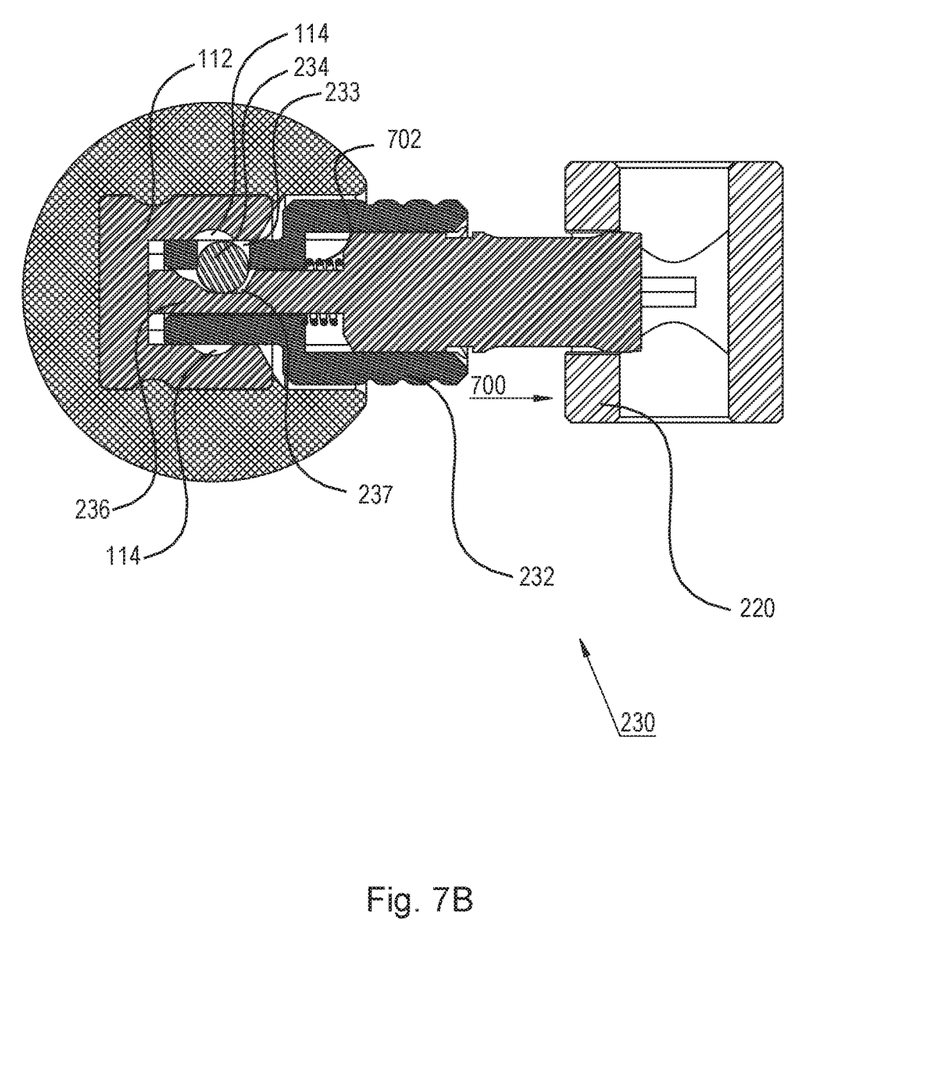

If the male connector sleeve 232 is slid back in resting position as illustrated by arrow 710 in FIG. 7A, away from the arm member 210, the securing ball 234 moves back in its protruding position as shown in FIG. 2 A and FIG. 7A, If this occurs when the male connector sleeve 232 is inserted in the female quick release connector 112, as shown in FIG. 3 and FIG. 7A, the securing ball 234 protrudes in the indentation 114 of the female quick release connector 112. In this way, the connection between the male quick release connector 230 and the female quick release connector 112 is secured. The male connector sleeve 232 is preferably spring loaded by, for example, a spring 702 with a bias indicated by arrow 710 away from the arm member 210. As an additional security, a blocking member 240 shown in FIGS. 2A, 2B and 7A is provided between the male connector sleeve 232 and the connector holding member 220. This type of quick release coupling is arranged to provide a quick and secure way of coupling and de-coupling the connection module to and from the carrying arm 200.

FIG. 2 B shows a top view of the carrying arm 200 and the stationary stand 250. FIG. 2 B shows in particular the hole 202 in another perspective. FIG. 2 B also shows a pivotal connection 224 between the arm member 210 and the connector holding member 220. The pivotal connection 224 provides the pivoting axis 222 that is perpendicular to the orientation of the male quick release connector 230. The pivoting axis 222 between the arm member 210 and the connector holding member 220 is parallel to a stand pivoting axis between the arm member 210 and the stationary stand 250. Alternatively, more pivotal connections or a single pivotal connection with more than one degree of freedom are provided between the arm member 210 and the connector holding member 220.

FIG. 3 shows the connection module 100 connected to the carrying arm 200. With the male quick release connector 230 provided in the female quick release connector 112 and the female quick release connector 112 connected to the ball 110 in a way that the female quick release connector 112 is fully comprised by the ball 110, a very compact connection is provided between the connection module 100 and the carrying arm 200. The connectors may also be provided in an opposite way—the female quick release connector 112 connected to the connector holding member 220 and the male quick release connector 230 connected to the ball 110. This would mean the ball 110 and with that, the connection module 100 comprises a further protruding part.

As to the connector holding member 220, providing connectors in an opposite way would either comprise a hole or a protruding part holding the female quick release connector 112. A hole in the connector holding member 220 for receiving the male quick release connector 230 when connected to the ball 110 would make it very difficult, if not impossible, to provide the pivotal connection 224 (FIG. 2 B) by means of a screw or bolt through the whole of the arm member 210. Alternatively, the pivotal connection may be provided by screws or bolts not being provided entirely through the whole connector holding member 220. This could result in a less robust connection between the arm member 210 and the connector holding member 220. And a protruding member for holding the female quick release connector 112 would result in a total construction less compact than the one discussed above.

In again another embodiment, the ball 110 is provided with a hole with a screw thread and the connector holding member 220 with a through hole for a bolt or a screw for connecting the ball 110 to the connector holding member 220. In this embodiment, both the ball 110 and the connector holding member 220 comprise a female directional connector. Such connection is less convenient to use than the connector discussed above, in particular not in case a screwdriver is required. Additionally or alternatively, other types of connectors may be used for connecting the monitor connection module 100 to the carrying arm 200. Other available and new connection types, including quick release mechanisms, may be used as well, with male-female connector parts, female-female connector parts and with hermaphrodite connector types, comprising both protruding and indented parts in connector parts.

Figure 4:
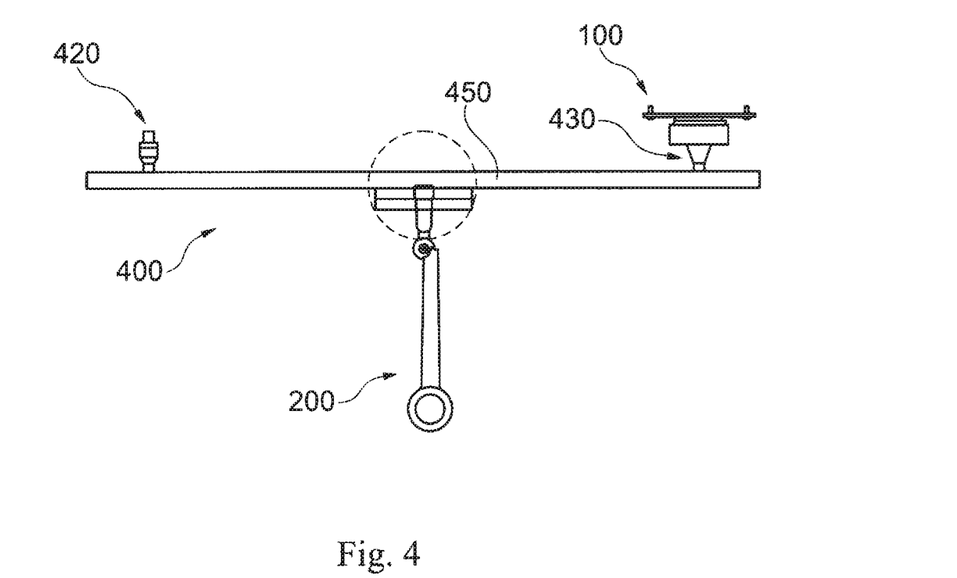
FIG. 4: shows a first multi monitor holding module
Figure 4A:
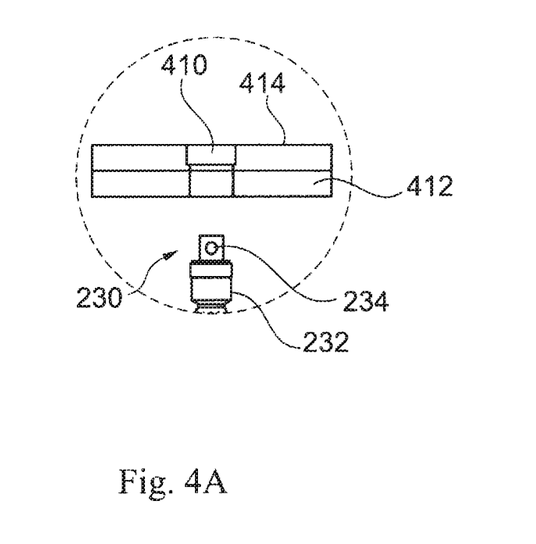
FIG. 4A: shows an enlarged view of a portion of FIG. 4 circled in broken lines differing in that the female directional connector is disconnected from the male quick release connector.

FIG. 4 shows the carrying arm 200 connected to a first multi monitor holding module 400 for carrying multiple monitors. The first multi monitor holding module 400 comprises a further female directional connector 410 connected to a first bar connecting plate 412 by being provided in the first bar connecting plate 412. The further female directional connector 410 is arranged to be connected to the male quick release connector 230. Alternatively, the further female directional connector 410 and the first bar connecting plate 412 are provided in one single piece and one single material. FIG. 4A shows an enlarged view of a portion of FIG. 4 circled in broken lines differing in that the female directional connector 410 is shown disconnected from the male quick release connector 230.

The first bar connecting plate 412 is pivotally connected to a second bar connecting plate 414 such that the first bar connecting plate 412 and the second bar connecting plate 414 are pivotable with respect to one another wherein the pivotal axis of the connection is axially oriented to the orientation of the further female directional connector 410. The second bar connecting plate 414 is connected to a first holding bar 450 and may be connected in a fixed way.

The first multi monitor holding module 400 further comprises a further male quick release connector 420 and a yet further male quick release connector 430. The further male quick release connector 420 and the yet further male quick release connector 430 are arranged to be connected to the female quick release connector 112 comprised by the monitor connection module 100. The yet further male quick release connector 430 as shown in FIG. 4 may be the same as shown in other embodiments or of a different type. With two male connectors oriented substantially parallel to one another, substantially perpendicular to the orientation of the first holding bar 450 and substantially parallel as well as substantially opposite to the orientation of the further female directional connector 410, the first multi monitor holding module 400 is arranged for holding two monitors and/or other accessories.

Figure 5:
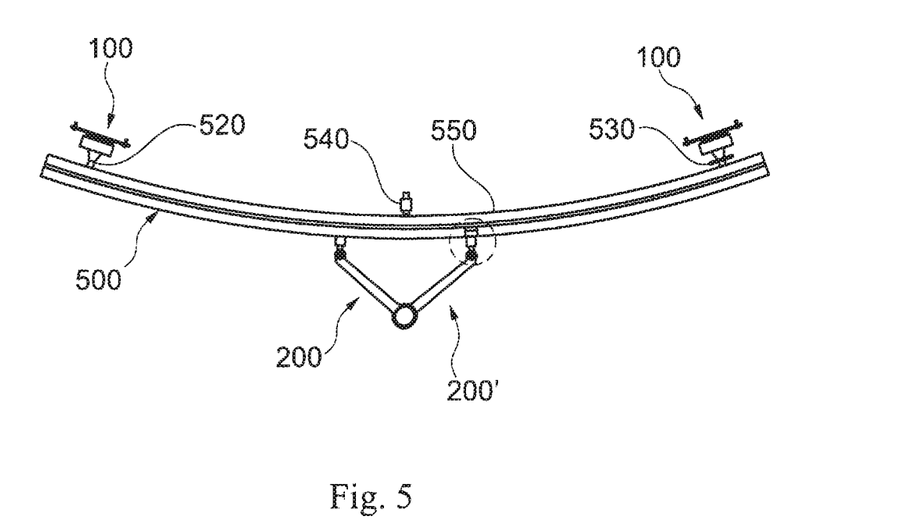
FIG. 5: shows a second multi monitor holding module
Figure 5A:
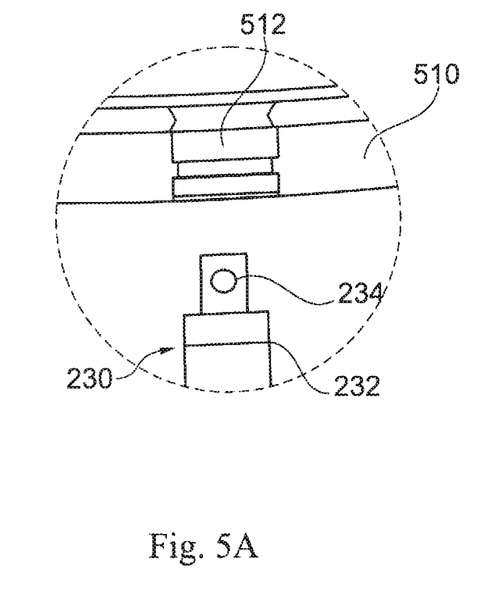
FIG. 5A: shows an enlarged view of a portion of FIG. 5 circled in broken lines differing in that the female directional connector is disconnected from the male quick release connector.

FIG. 5 shows a second multi monitor holding module 500. The second multi monitor holding module 500 is connected to a first carrying arm 200 and a second carrying arm 200'. The second multi monitor holding module 500 comprises a second holding bar 550 which has a rail 510 provided in it for holding at least 2 fixed or slidable female connector members 512. The slidable female connector members 512 are arranged for connecting with the male quick release connector 230 connected to the first carrying arm 200 and the second carrying arm 200'. FIG. 5A shows an enlarged view of a portion of FIG. 5 circled in broken lines differing in that the female directional connector 512 is shown disconnected from the male quick release connector 230.

On a side opposite to where the rail 510 is located, the second holding bar 550 has a first fixed or slidable male connector 520, a second fixed or slidable male connector 530 and a third fixed or slidable male connector 540 connected to it. The male quick release connector 520 as shown in FIG. 5 may be the same as shown in other embodiments or of a different type. The male connectors are oriented substantially parallel to one another, substantially perpendicular to the orientation of the second holding bar 550 and substantially parallel as well as substantially opposite to the orientation of the slidable female connector members 512, the second multi monitor holding module 500 is arranged for holding multiple monitors, up to an amount of three in this embodiment. A higher amount may be envisaged as well.

The second holding bar 550 has a slight curvature, which means that the orientation of the first male connector 520 is not entirely parallel to the orientation of the second male connector 530 and the third male connector 540, but at least substantially parallel. The orientation of the male connectors is perpendicular to the orientation of a tangent to the second holding bar 550 at a location where the respective male connector is connected to the second holding bar 550. The second holding bar 550 may be arranged to have a fourth male connector connected to it for holding yet an additional monitor.

Figure 6A:
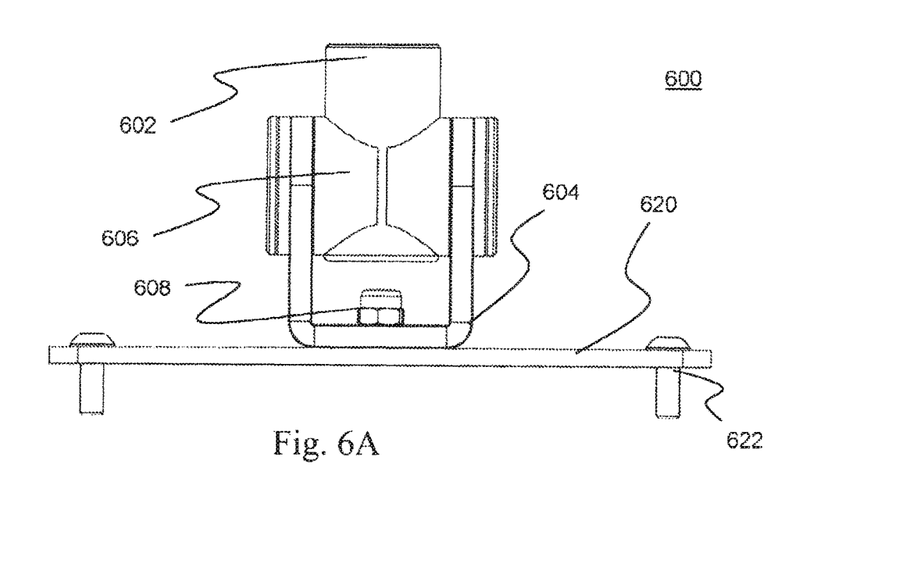
Figure 6B:
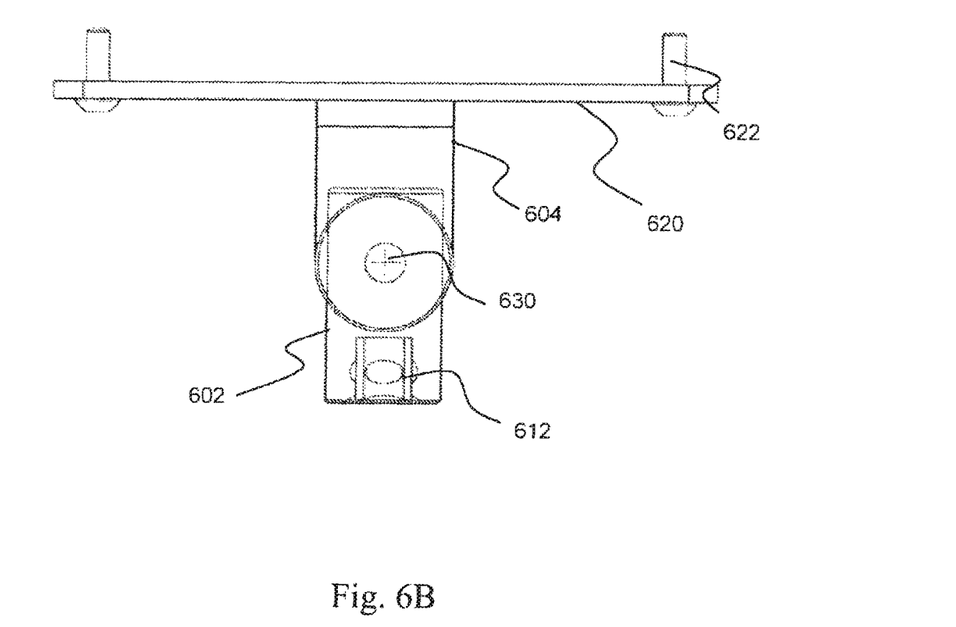

FIG. 6 A and FIG. 6 B show a further monitor connection module 600. The monitor connection module 600 comprises a connector plate 620. To the connector plate 620, a U-shaped bracket 604 is provided as a first joint member. The bracket 604 is connected to the connector plate 620 by means of a bolt 608 that is fit on a protruding threaded bolt member (not shown) provided on the connector plate 620. Alternatively, the connector plate 620 and the U-shaped bracket 604 are provided in one single piece and one single material.

To the bracket, a connection member 602 is provided as a part of a second joint member. The connection member 602 is fit in a connection holding member 606 as a part of a second joint member. The connection holding member 606 is pivotally connected to the bracket 604, allowing a movement over a pivoting axis 630.

The connection between the connection holding member 606 and the connection member 602 may be provided as a rigid connection or as a pivoting connection. In the latter case, the connection may be used to swivel a monitor to which the connector plate 620 is connected from portrait orientation to landscape orientation and vice versa.

To the connection member 602, a female quick release connector 612 is connected. In this particular case, the female quick release connector 612 is provided inside the connection member 602. The female quick release connector 612 is arranged for coupling the monitor connection module 600 to a male quick release connector like the male quick release connector 230 as depicted in FIG. 2 and other Figures. Alternatively, the connection member 602 and the female quick release connector 612 are provided in one single piece and one single material.

The invention claimed is:

1. A coupling device for coupling an accessory to a fixture, the coupling device comprising:
   a coupling module for coupling the accessory to the coupling device;
   a first directional connector for providing a releasable connection to a second directional connector, with one of the first directional connector or the second directional connector operatively associated with a fixture and the first directional connector being arranged to be connected to the second directional connector by a releasable connection operatively associated therebetween; and
   a joint for connecting the other of the first directional connector or the second directional connector to the coupling module;
   Wherein:
   the joint comprises a first joint member connected to the coupling module and a second joint member connected to the other of the first directional connector or the second directional connector;
   the first joint member and the second joint member are connected for providing the joint such that the first joint member and the second joint member are swivelable relative to one another over at least one swiveling axis which swiveling axis is provided under an angle with respect to the orientation of the other of the first directional connector or the second directional connector;
   the other of the first directional connector or the second directional connector is directed in a longitudinal orientation with respect to the joint if the joint is in substantially a centre position;
   wherein one of the first directional connector or the second directional connector receives the other in a longitudinal orientation with respect to the joint if the joint is in substantially the centre position;
   wherein the releasable connection comprises a protruding part that protrudes in mating engagement with a receiving part in a direction transverse to the longitudinal direction with the releasable connection further comprising an actuator biased to a resting position which maintains the protruding part in mating engagement with the receiving part and which protruding part does not matingly engage the receiving part with the actuator forcibly actuated against the bias out of the resting position; and
   wherein with the protruding part and the receiving part releasably connecting the first and second directional connectors the first and second joint members are pivotable about a pivoting axis that extends longitudinally of the directional connectors if the joint is in substantially the centre position.

2. The coupling device according to claim 1, wherein the swiveling axis is oriented substantially perpendicular to the orientation of the first directional connector.

3. The coupling device according to claim 1, wherein the joint is a ball joint.

4. The coupling device according to claim 1, wherein the second joint member is a ball comprising the ball joint.

5. The coupling device according to claim 1, wherein the joint comprises at least one of a following:
   a first uni-directional swivel joint, wherein the swiveling axis of the first uni-directional swivel joint is substantially perpendicular to the longitudinal orientation of the first and second directional connectors; or
   a second uni-directional swivel joint, wherein the pivotal axis of the second uni-directional swivel joint is axially oriented to the longitudinal orientation of the first and second directional connectors.

6. The coupling device according to claim 1, wherein the at least one of the first directional connector or the second directional connector is of a male type and the other of the first or second directional connector is of a female type.

7. The coupling device according to claim 1 wherein the fixture comprises:
an arm for carrying an accessory, the arm comprising:
an arm member;
the one of the first directional connector or the second directional connector being pivotally connected to the arm member via an arm pivotal connection member;
wherein the one of the first directional connector or the second directional connector is connected to the arm member such that the one of the first directional connector or the second directional connector is oriented substantially perpendicular to an arm pivotal axis of the pivotal connection member.

8. The coupling device according to claim 7, wherein the arm pivotal axis is substantially perpendicular to a length of the arm.

9. The coupling device according to claim 7, further comprising a pivotal stand connecting member for providing a pivotal connection to a stand and the pivotal connection member is provided substantially parallel to the pivotal connection to the stand.

10. The coupling device according to claim 7, comprising a single arm pivotal connection between the one of the first directional connector or the second directional connector and the arm member.

11. The coupling device according to claim 7, wherein the one of the first directional connector or the second directional connector is pivotally connected to the arm member such that the arm member and the one of the first directional connector or the second directional connector are pivotable in a single dimension.

12. The coupling device of claim 1 wherein the coupling module is a monitor connector plate and the accessory is a monitor.

13. The coupling device of claim 1 which in use provides a releasable connection with the one of the first directional connector or second directional connector operatively associated with a fixture comprising an accessory carrying arm.

14. The coupling device of claim 3 wherein the ball joint comprises the second joint member comprising a ball, the ball being confined in the first joint member, the first joint member comprising a joint cover housing and a joint bottom housing.

15. The coupling device of claim 14 wherein the coupling device comprises a connector plate, the connector plate being connected to the joint bottom housing.

16. The coupling device of claim 3 wherein the one of the first directional connector or the second directional connector receives the other to collectively define a female/male quick release connector respectively, wherein the female quick release connector is incorporated in a ball of the ball joint.

17. A coupling element comprising:
a coupling module for coupling an accessory to the coupling element,
a first directional connector and a second directional connector, at least one of the first directional connector or the second directional connector comprising a releasable connection operatively associated therebetween;
a joint for connecting the first directional connector to the coupling module;
Wherein:
the joint comprises a first joint member connected to the coupling module and a second joint member that comprises the first directional connector;
the first joint member and the second joint member are connected for providing the joint such that the first joint member and the second joint member are swivelable relative to one another over at least one swiveling axis that is provided under an angle with respect to a longitudinal orientation of the first and second directional connectors if the joint is in substantially a centre position;
the first and second joint members are pivotable about a pivoting axis that extends along the longitudinal orientation of the first and second directional connectors if the joint is in substantially the centre position;
the joint is a ball joint;
the second joint member is a ball of the ball joint;
the first directional connector is of a female type recessed in the ball of the ball joint; and
wherein the releasable connection comprises a protruding part that protrudes in mating engagement with a receiving part in a direction transverse to the longitudinal orientation with the releasable connection further comprising an actuator biased to a resting position which maintains the protruding part in mating engagement with the receiving part and which protruding part does not matingly engage the receiving part with the actuator forcibly actuated against the bias out of the resting position.

* * * * *